US007898221B2

(12) United States Patent
Owens

(10) Patent No.: US 7,898,221 B2
(45) Date of Patent: Mar. 1, 2011

(54) VARYING-TEMPERATURE OPERATION OF BATTERY-POWERED ELECTRONIC DEVICES

(75) Inventor: Christopher Owens, Crowthorne (GB)

(73) Assignee: Agere Systems Inc., Allentown, PA (US)

( * ) Notice: Subject to any disclaimer, the term of this patent is extended or adjusted under 35 U.S.C. 154(b) by 823 days.

(21) Appl. No.: 11/608,400

(22) Filed: Dec. 8, 2006

(65) Prior Publication Data

US 2008/0136653 A1 Jun. 12, 2008

(51) Int. Cl.
*H02J 7/00* (2006.01)
*H02J 7/04* (2006.01)
*H02J 7/16* (2006.01)

(52) U.S. Cl. .......................... 320/136; 320/150; 320/153

(58) Field of Classification Search .................. 320/150, 320/136

See application file for complete search history.

(56) References Cited

U.S. PATENT DOCUMENTS 4,801,922 A * 1/1989 Worrell et al. ................ 340/586
5,710,507 A * 1/1998 Rosenbluth et al. ............ 307/66
5,795,664 A * 8/1998 Kelly ............................... 429/7
6,169,930 B1 * 1/2001 Blachek et al. ................. 700/79
2002/0003417 A1 * 1/2002 Bito et al. ..................... 320/152
2002/0093312 A1 * 7/2002 Choo ............................ 320/149
2005/0017690 A1 * 1/2005 Kamenoff ..................... 320/150
2006/0119322 A1 * 6/2006 Maleki et al. ................. 320/150
2006/0164042 A1 * 7/2006 Sim .............................. 320/150

* cited by examiner

*Primary Examiner* — Edward Tso
*Assistant Examiner* — Ahmed Omar
(74) *Attorney, Agent, or Firm* — Mendelsohn, Drucker & Associates, P.C.; Edward J. Meisarosh; Steve Mendelsohn

(57) ABSTRACT

In one embodiment, a consumer electronic device has a rechargeable battery, battery safety circuitry, and consumer electronic device circuitry with a controller. The rechargeable battery has a present temperature and a presently available effective capacity, and provides power to the electronic device via the battery safety circuitry. The controller determines whether the rechargeable battery might have, at a battery temperature greater than the present battery temperature, a potential effective capacity greater than the presently available effective capacity and, upon such determination, provides an indication to the user that additional effective capacity might become available if the battery temperature were raised.

25 Claims, 2 Drawing Sheets

POWER UP DEVICE — 301
GET INDICATION OF BATTERY TEMPERATURE — 302
PROVIDE AN INDICATION WHETHER A GREATER EFFECTIVE CAPACITY WOULD BE AVAILABLE AT A DIFFERENT BATTERY TEMPERATURE — 303

POWER UP DEVICE — 401
GET INDICATIONS OF (i) BATTERY TEMPERATURE, AND (ii) PRESENTLY AVAILABLE EFFECTIVE CAPACITY — 402
WOULD THE BATTERY HAVE A SIGNIFICANTLY GREATER EFFECTIVE CAPACITY AT A DIFFERENT BATTERY TEMPERATURE ? — 404
NO
YES
PROVIDE AN INDICATION THAT A GREATER EFFECTIVE CAPACITY WOULD BE AVAILABLE AT TEMPERATURES APPROACHING THE DIFFERENT BATTERY TEMPERATURE — 403

VARYING-TEMPERATURE OPERATION OF BATTERY-POWERED ELECTRONIC DEVICES

BACKGROUND OF THE INVENTION

1. Field of the Invention

The current invention relates to battery-powered devices, and in particular, to the operation of battery-powered devices subjected to varying temperatures.

2. Description of the Related Art

Numerous consumer electronic devices are powered by batteries. Batteries allow a consumer electronic device to be mobile, i.e., to be operational away from dedicated sources of electrical power, such as wall sockets. Various battery technologies exist. Some technologies provide for single-use batteries while other technologies provide for rechargeable use. Rechargeable batteries are commonly used in mobile computers, mobile phones, cameras, handheld computers, handheld music players, and other consumer electronic devices.

One common rechargeable battery technology is lithium-ion (Li-ion). One type of Li-ion battery is the Li-ion polymer battery, also known as Li-Poly, Li-Po, or LiPo. Li-ion batteries have several advantages over other rechargeable battery technologies, such as superior energy density by weight, and the ability to be molded into a variety of shapes, including relatively thin and/or irregular shapes. Li-ion batteries are also capable of being charged and discharged at relatively high currents. Li-ion batteries have some drawbacks, such as their susceptibility to depletion damage, overheating and combustion, and their consequent need for safety and control circuitry. Other battery types may also be provided with safety and/or control circuitry.

The safety and control circuitry is typically capable of determining the temperature of the battery. One way to determine the battery temperature is to use a thermistor sufficiently close to the battery such that the thermistor is consistently at approximately the same temperature as the battery. Alternatively, the temperature of the battery may be determined by circuitry that measures particular properties of the battery, such as the resistivity of the battery, where the battery temperature is derived based on a known relationship with the measured properties. Other ways of determining the battery temperature are also possible. Consumer batteries typically operate best at an ambient temperature of around room temperature, i.e., 20-25° C. However, the operating range of Li-ion batteries is greater. For example, in certain mobile technologies, the operating range of the Li-ion batteries is expected to be −10 to +55° C.

The temperature of a battery affects the battery's operating chemistry, and thus its rates of electric current charge and discharge. As the temperature of a typical Li-ion battery decreases, its internal resistance increases. At temperatures below freezing (i.e., below 0° C.), the discharge capacity of a typical Li-ion battery is significantly reduced compared to its capacity at room temperature. The charging of a Li-ion battery is also affected by the battery temperature.

FIG. 1 shows a simplified block diagram of mobile consumer electronic device 101. Mobile consumer electronic device 101 comprises battery 102, battery safety circuitry 103, and consumer electronic device circuitry 104. Battery 102 comprises one or more electricity-producing chemical cells, such as Li-ion cells, and is preferably rechargeable. Battery 102 may be packaged in a casing that is adapted to be removed and/or replaced by a consumer. One example of such an embodiment is the battery for a typical mobile telephone. The casing containing battery 102 typically includes at least a portion of battery safety circuitry 103. Such a battery is sometimes referred to as a "smart battery." Battery 102 may also be packaged in a casing that is not designed for removal and/or replacement by a consumer, in which case the battery casing also typically includes at least a portion of battery safety circuitry 103. Such a battery can be considered an integrated component of consumer electronic device 101. One example of such an embodiment is a portable personal music player, such as the iPod produced by Apple Computer, Inc., of Cupertino, Calif.

Battery safety circuitry 103 is designed to prevent the depletion damage, overheating, and combustion of battery 102 by regulating the electrical current into and out of battery 102. Battery safety circuitry 103 typically includes circuitry that determines the temperature of battery 102. At least a portion of battery safety circuitry 103 is typically encased with battery 102, and would thus be removed from mobile consumer electronic device 101 if battery 102 were removed. The rest of battery safety circuitry 103 may be located with consumer electronic device circuitry 104, and thus would remain in mobile consumer electronic device 101 if battery 102 were removed.

Consumer electronic device circuitry 104 comprises the circuitry of consumer electronic device 101 that provides desired electronic functionality to mobile consumer electronic device 101, is not encased with battery 102, and is not battery safety circuitry for battery 102. Consumer electronic device circuitry 104 typically comprises a controller for mobile consumer electronic device 101, such as controller 105, and can include means for providing information to a user, i.e., a human-machine interface (HMI), such as a display screen, a speaker, or LEDs (not shown). Controller 105 interacts with battery safety circuitry 103 to get electrical power from battery 102 via battery safety circuitry 103.

Consumer electronic devices are not typically used at temperatures below freezing because consumers generally prefer to avoid exposing themselves, and thus the personal electronic devices they have with them, to such cold temperatures, which are generally considered uncomfortable and potentially dangerous. However, occasions arise in which a consumer and a consumer electronic device are at cold temperatures near or below freezing. If the consumer electronic device is an inactive state, then any current draw from the battery is typically so low that the effects of the low temperature are generally negligible. However, shifting the consumer electronic device to an active state, e.g., by trying to place a call with a mobile phone, may require significant current flows, which may be unavailable at low temperatures, or may cause significant voltage drops and subsequent brown outs for the control circuits that can result in the shutdown of the consumer electronic device.

SUMMARY OF THE INVENTION

In one embodiment, the invention is an electronic device adapted to be powered by a battery having a present temperature and a presently available effective capacity. The electronic device comprises a controller adapted to (i) receive a first indication of the present temperature of the battery, and (ii) provide a second indication designed to inform a recipient of the second indication that a potentially available effective capacity greater than the presently available effective capacity would be available at a different battery temperature.

In another embodiment, the invention is a method for a controller in an electronic device adapted to be powered by a battery having a battery temperature and a presently available effective capacity. The method comprises (i) receiving a first indication of a present temperature of the battery, and (ii) providing a second indication designed to inform a recipient of the second indication that a potentially available effective capacity greater than the presently available effective capacity would be available at a different battery temperature.

In another embodiment, the invention is an electronic device adapted to be powered by a battery having a battery temperature and a presently available effective capacity. The electronic device comprises (i) means for receiving a first indication of a present temperature of the battery, and (ii) means for providing a second indication designed to inform a recipient of the second indication that a potentially available effective capacity greater than the presently available effective capacity would be available at a different battery temperature.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

As discussed above, at temperatures below freezing, energy that is stored within battery 102 cannot be reliably transferred to mobile electronic device circuitry 104. If the temperature of battery 102 is raised, for example, to at least 0° C., then the internal resistance of battery 102 will be reduced and its effective capacity will be increased. Such warming can be achieved by placing consumer electronic device 101 proximate to the user, or close to any other suitable source of warmth.

Figure 1:
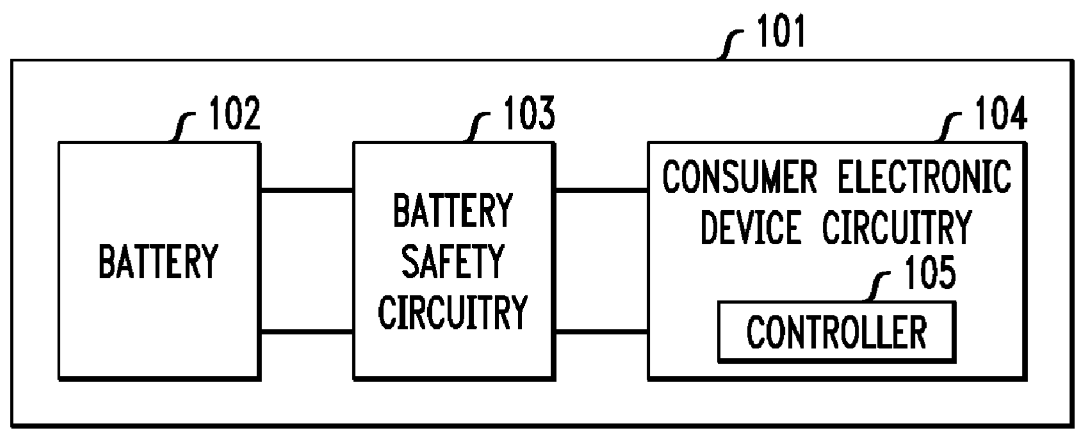
FIG. 1 shows a simplified block diagram of a mobile consumer electronic device whose battery uses safety circuitry.

One embodiment of the present invention is a consumer electronic device having an architecture similar to the architecture of consumer electronic device 101 of FIG. 1, but wherein controller 105 has different functionality. In particular, controller 105 of the inventive embodiment tracks the temperature of battery 102. That temperature value may be available from battery safety circuitry 103. If the temperature value is not readily available for provision to controller 105, then means (not shown) may be added to mobile consumer electronic device 101 to provide the temperature of battery 102 to controller 105. The battery temperature may be measured or may be derived.

If controller 105 determines that the battery temperature is below a particular threshold temperature, then controller 105 causes consumer electronic device circuitry 104 to provide an alert to the user. The purpose of the alert is to inform the user that raising the temperature of the battery will increase the effective capacity of the battery. This is particularly important and useful in an emergency situation where the user needs to communicate with emergency service providers or others who may provide needed assistance. The alert provided could be as simple as a beep or other audible sound with predetermined properties, a predetermined LED pattern, or a symbol on a user display. An advantage of a simpler alert is that a simpler alert is less likely to be itself affected by the cold temperature than a more elaborate alert which may require use of an LCD monitor (not shown) of consumer electronic device 101. However, as described below, the invention does not preclude use of such mechanisms.

As one skilled in the art would recognize, the threshold temperature for providing the alert could be preprogrammed or could be set (i) by the user, (ii) by a network (not shown) communicatively connected to consumer electronic device 101, (iii) dynamically by an appropriate programmatic procedure, or (iv) by any other suitable means for setting a threshold temperature. In an alternative embodiment, controller 105 tracks the ambient temperature or the temperature of another component of consumer electronic device 101, from which the battery temperature may be derived.

Figure 2:
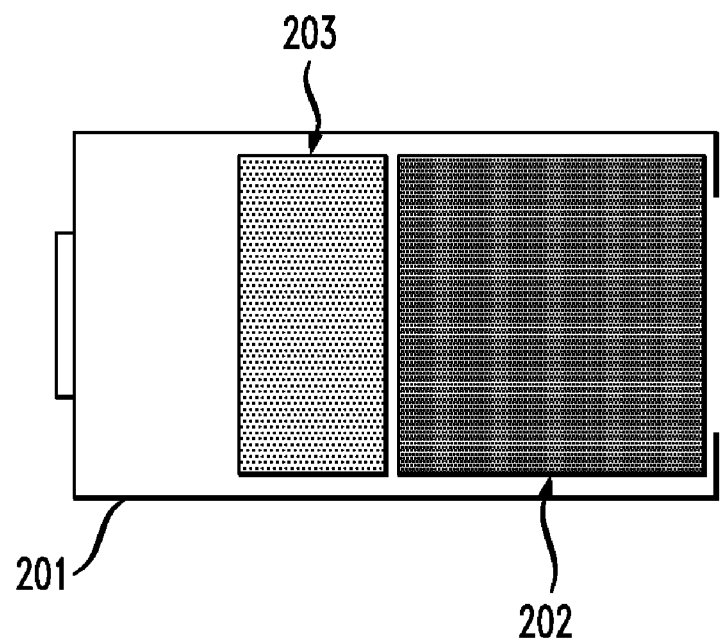
FIG. 2 shows a sample display of available battery power for a mobile consumer electronic device.

FIG. 2 shows sample display 201 of the available battery power for an exemplary mobile consumer electronic device in a sub-freezing environment, whose battery's presently available effective capacity is about half of its maximum effective capacity, and its potentially available additional effective capacity is about a quarter of its maximum effective capacity. Battery power display 201 shows available battery power to a user, and may be implemented as part of an LCD monitor, an LED display, or any other suitable means for displaying to a user the available battery power. Battery power display 201 shows presently available effective capacity representation 202, and potentially available, at, e.g., 0° C. or warmer, additional effective capacity representation 203.

The potentially available effective capacity may illustratively be represented as (i) potentially available additional effective capacity, (ii) potentially available total effective capacity, which is the sum of the presently available effective capacity and the potentially available additional effective capacity, or (iii) both. In an alternative embodiment, presently available effective capacity representation 202 and potentially available additional effective capacity representation 203 may be presented in any suitably different visual representations, e.g., through differences in color, tone, transparency, patterns, etc.

In an alternative embodiment, the capacity representations may be numeric, showing capacities as percentages of effective capacity available at room temperature after a full charge, e.g., "50%" for presently available effective capacity and "25%" for potentially available additional effective capacity. In one embodiment, the total potentially available effective capacity is represented. Thus, for example, if numeric capacity representations are used, then a display may show "50%" for presently available effective capacity and "75%" for potentially available total effective capacity. In alternative embodiments, the percentages may represent proportions of other suitable quantities. In one embodiment, a presently available effective capacity representation and a potentially available effective capacity representation are distinguished by accompanying text on the user display.

Since a user might not be aware that additional effective capacity may be available if the battery is warmed up, and might not recognize the significance of the simple alerts described above, more elaborate alerts may be used. Since the additional effective capacity potentially available from warming the battery up from a sub-freezing temperature is particularly useful in an emergency situation, a more elaborate alert may be particularly useful to a user in an emergency situation, who may be agitated and/or confused.

In one embodiment, the alert includes a text message on a user LCD screen instructing the user to warm up consumer electronic device 101 in order to increase the effective battery capacity. Such a text message should preferably appear for a brief period of a few seconds in order to lessen the drain on battery 102 that is caused by the message display and the attendant current draw of an LCD backlight. In one embodiment, the alert includes an audible verbal instruction to the user to warm up the device to increase the effective battery capacity, or other suitable verbal message alerting the user to the availability of additional battery capacity were the temperature of consumer electronic device 101 raised. The verbal message could be from a pre-recorded audio file, a dynamically computer-generated verbal instruction, or other suitable source of an audible message.

In one embodiment, the alert indicates to the user the impact that the additional effective battery capacity can have by increasing the temperature of battery 102. For example, in a telephony application, the human-machine interface (HMI) of consumer electronic device 101 can indicate to the user, via text and/or sound, the approximate number of additional talk-time minutes that can be gained by warming up consumer device 101, and consequently, battery 102.

In one embodiment, when turned on, a user display always shows both the presently available effective capacity and the potentially available effective capacity that would be available at a different temperature. The alert to the user comprises showing different values for the respective effective capacities. For example, at warm temperatures, effective capacity display 201 of FIG. 2 would show only present effective capacity representation 202 since there would not be significant potentially available additional effective capacity.

In one embodiment, wherein consumer electronic device 101 is adapted to communicate with a communications network, controller 105 may provide an alert via the communications network to a person or device other than the user. For example, an alert indicating the sub-freezing temperature and the location of consumer electronic device 101, and consequently of the user, may be provided to an emergency services provider, or another appropriate node in the communications network.

In addition to alerting and/or advising the user through the HMI of consumer electronic device 101, controller 105 can take additional measures to increase the effective capacity of battery 102 at low temperatures. In one embodiment, where consumer electronic device 101 has mobile communication capability, controller 105 monitors the voltage provided by battery 102, particularly during transmit periods when battery 102 experiences peak loads, and if controller 105 determines that there is risk of a brownout, controller 105 reduces the transmit power and alerts the user to raise the temperature of battery 102 to increase the effective capacity of battery 102.

Figure 3:
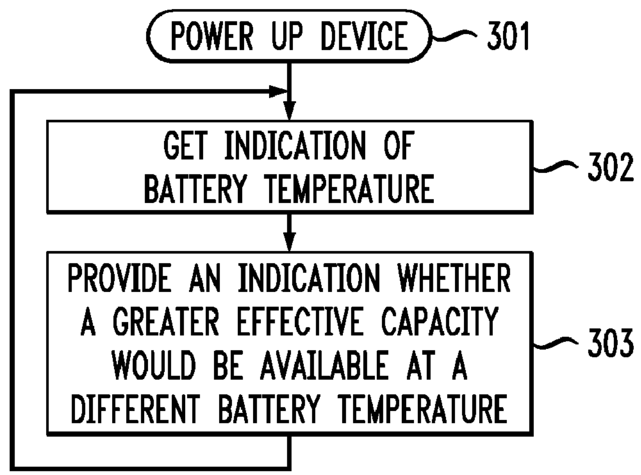
FIG. 3 shows a flow chart for a method for the operation of a battery-powered electronic device in accordance with one embodiment of the present invention.

FIG. 3 shows a flow chart for a method for the operation of a battery-powered electronic device in accordance with one embodiment of the present invention. Following power-up of the device (step 301), a controller gets an indication of the present battery temperature (step 302). This indication could be a measure of the battery temperature itself, of the temperature of a component proximate to the battery, or of the ambient temperature, from which the battery temperature can be inferred. Alternatively, this indication might be a signal correlated to a measure of battery temperature, but not itself independently indicative of battery temperature. For example, the indication might be a pulse that indicates that a specified temperature threshold has been crossed, but wherein the pulse does not itself indicate what that temperature threshold is. Based on the received indication, the controller provides an indication whether a greater effective capacity would be available at a different battery temperature (step 303). Following step 303, the method returns to step 302. A pause may be inserted before returning to step 302 (not shown). In one embodiment, the controller has access to information relating battery temperature to effective capacity, and based on that information and the present battery temperature, alerts a user if significant increases in effective capacity would result from modifying the battery temperature. In one embodiment, with a suitable battery type, the controller provides an indication of the expected increase in the effective capacity if the battery temperature were appropriately modified.

Figure 4:
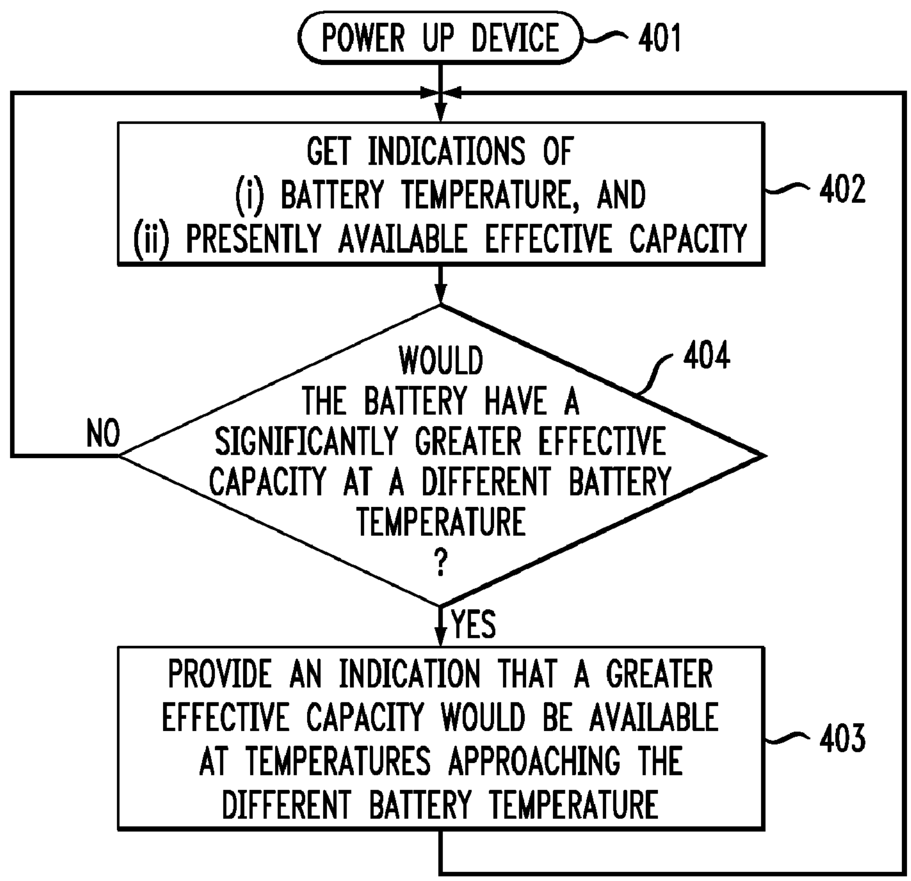
FIG. 4 shows a flow chart for a method for the operation of a battery-powered electronic device in accordance with another embodiment of the present invention.

FIG. 4 shows a flow chart for a method for the operation of a battery-powered electronic device in accordance with another embodiment of the present invention. Following power-up of the device (step 401), a controller gets indications of (i) the present battery temperature, and (ii) the presently available effective capacity (step 402). Based on the above indications, the controller determines whether the battery would have a significantly greater effective capacity at a different battery temperature (step 404). The particular level of increase considered significant is a threshold designed to prevent annoying and/or overwhelming the user with alerts. The present battery temperature can also be used in conjunction with a threshold temperature to suppress alerts outside of a desired temperature range (not shown), e.g., to limit alerts to below-freezing present battery temperatures. If in step 404 the controller determines that no significant increase in effective capacity is available, then the process returns to step 402. A pause may be inserted before returning to step 402 (not shown). If in step 404 the controller determines that a significant increase in effective capacity is available, then the controller provides an indication that a greater effective capacity would be available at temperatures approaching the different battery temperature (step 403). Following step 403, the process returns to step 402. A pause may be inserted before returning to step 402 (not shown).

Several exemplary embodiments have been described using controller 105 located in consumer electronic device circuitry 104. However, the particular identity or location of the component performing the novel functions described is not mandatory. The novel functions described can be carried out by circuitry located in the battery safety circuitry, general-purpose circuitry, or any suitable means for controlling electronic circuitry.

Several exemplary embodiments have been described using "freezing" or "0° C." as threshold temperature values. In alternative embodiments, colder or warmer temperatures are be used as threshold values.

Several exemplary embodiments have been described in which a temperature threshold is used by a controller to determine whether to provide an indication that altering the temperature of the battery would increase the effective capacity of the battery. In an alternative embodiment, the controller uses a potentially available effective capacity threshold value, wherein if the potentially available effective capacity, additional or total, is greater than the threshold value, then the controller provides the indication. In an alternative embodiment, the controller provides the indication if the potentially available effective capacity, additional or total, is greater by at least a threshold factor than the presently available effective capacity.

Several exemplary embodiments have been described in which raising the temperature of the battery increases its effective capacity. In an alternative embodiment, with an appropriate battery type, the effective capacity of a battery would be increased if the temperature of the battery were decreased.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

I claim:

1. An electronic device adapted to be powered by a battery having a present temperature and a presently available effective capacity, wherein:

the electronic device does not include any electric heating element for heating the battery; and the electronic device comprises a controller adapted to:

receive a first indication of the present temperature of the battery;

determine that, at a battery temperature higher than the present battery temperature, there would be a potentially available effective capacity greater, by at least a set threshold, than the presently available effective capacity; and based on the determination, provide a second indication designed to inform a user receiving the second indication that a would-be-available effective capacity greater than the presently available effective capacity would be available at a different battery temperature.

2. The device of claim 1, wherein the controller is further adapted to determine the potentially available effective capacity.

3. The device of claim 2, wherein the controller is adapted to:

receive a third indication of the presently available effective capacity; and determine the potentially available effective capacity for the different battery temperature based on the third indication.

4. The device of claim 1, wherein the second indication is provided to the user only if the present battery temperature is below a specified threshold temperature.

5. The device of claim 1, wherein the device further comprises a battery safety circuitry adapted to measure and provide to the controller the present battery temperature.

6. The device of claim 1, wherein the battery is rechargeable.

7. The device of claim 1, wherein the battery is one of Li-ion type and Li-poly type.

8. The device of claim 1, wherein the second indication comprises an audible alert.

9. The device of claim 8, wherein the second indication includes an audible message that warming the battery would provide the potentially available effective capacity greater than the presently available effective capacity.

10. The device of claim 1, wherein the second indication comprises a visible alert.

11. The device of claim 10, wherein the second indication comprises a display showing the presently available effective capacity and potentially available total effective capacity.

12. The device of claim 10, wherein the second indication comprises a display showing the presently available effective capacity and potentially available additional effective capacity.

13. The device of claim 10, wherein the second indication includes a visual message that warming the battery will provide the potentially available effective capacity.

14. A method for a controller in an electronic device adapted to be powered by a battery having a present battery temperature and a presently available effective capacity, wherein the electronic device does not include any electric heating element for heating the battery, the method comprising:

receiving a first indication of the present temperature of the battery;

determining that, at a battery temperature higher than the present battery temperature, there would be a potentially available effective capacity greater, by at least a set threshold, than the presently available effective capacity; and providing, based on the determination, a second indication designed to inform a user receiving the second indication that a would-be-available effective capacity greater than the presently available effective capacity would be available at a different battery temperature.

15. The method of claim 14, further comprising determining the potentially available effective capacity.

16. The method of claim 15, wherein the step of determining comprises:

receiving a third indication of the presently available effective capacity; and determining the potentially available effective capacity for the different battery temperature based on the third indication.

17. The method of claim 14, wherein the second indication is provided to the user only if the present battery temperature is below a specified threshold temperature.

18. The method of claim 14, wherein the second indication comprises an audible alert.

19. The method of claim 14, wherein the second indication includes an audible message that warming the battery would provide the potentially available effective capacity greater than the presently available effective capacity.

20. The method of claim 14, wherein the second indication comprises a visible alert.

21. The method of claim 20, wherein the second indication comprises a display showing the presently available effective capacity and potentially available total effective capacity.

22. The method of claim 20, wherein the second indication comprises a display showing the presently available effective capacity and potentially available additional effective capacity.

23. The method of claim 20, wherein the second indication includes a visual message that warming the battery will provide the potentially available effective capacity.

24. An electronic device adapted to be powered by a battery having a battery temperature and a presently available effective capacity, wherein the electronic device does not include any electric heating element for heating the battery, the electronic device comprising:

means for receiving a first indication of a present temperature of the battery;

means for determining that, at a battery temperature higher than the present battery temperature, there would be a potentially available effective capacity greater, by at least a set threshold, than the presently available effective capacity; and means for providing, based on the determining, a second indication designed to inform a user receiving the second indication that a would-be-available effective capacity greater than the presently available effective capacity would be available at a different battery temperature.

25. The electronic device of claim 4, wherein the second indication includes an instruction to the user to warm the battery.

* * * * *